May 31, 1932.  J. B. FLOWERS  1,860,807
PRODUCTION OF SOUND
Filed June 26, 1925   3 Sheets-Sheet 1

Inventor
John B. Flowers

May 31, 1932.  J. B. FLOWERS  1,860,807
PRODUCTION OF SOUND
Filed June 26, 1925   3 Sheets-Sheet 2

Inventor.
John B. Flowers

May 31, 1932. J. B. FLOWERS 1,860,807
PRODUCTION OF SOUND
Filed June 26, 1925 3 Sheets-Sheet 3

Inventor
John B. Flowers

Patented May 31, 1932

1,860,807

UNITED STATES PATENT OFFICE

JOHN B. FLOWERS, OF BROOKLAWN, NEW JERSEY

PRODUCTION OF SOUND

Application filed June 26, 1925. Serial No. 39,873.

This invention relates to means for producing a desired sound or combinations of sounds.

The object of the invention is to provide a record or tablet for use with a phonograph or the like and adapted to produce any combination of sounds or tones, determined by the contour of the record formed in accordance with a graphic curve representing said sounds or tones.

A feature of the invention resides in providing a phonograph record with a contour in accordance with a graphic representation of a tone and its harmonics, whereby upon the production of said tones and its harmonics, a plurality of tones are sounded adapted to act as an accompaniment for a singer or instrument.

Another feature resides in the provision of curve representations of the letters of the alphabet and their adaptation for use on the surface of a record for producing words, or a composite of the sounds of individual letters.

A further feature resides in the provision of a system enabling the representation in curve form of combinations of any conceivable sounds, and the translation of the curve form to an indented track on a record adapted to produce the sounds when used with a graphophone or phonograph.

Other features and adaptations of my invention will be apparent from the following description read in conjunction with the accompanying drawings in which Figure 1 illustrates a curve of a pure tone representing a wave combining simple harmonic motion with uniform motion.

Figure 1:
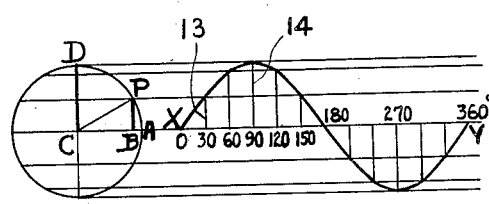

Considering the drawings, Figure 1 shows a sine curve which represents a pure tone. Every pure tone may be represented by a sine wave forming a complete cycle. If, for convenience, the amplitude of vibration is assumed to have a value based upon using a radius of one in plotting a complete cycle of 360 degrees, the amplitude at any point will be equal to the sine of the angle at that point. Assuming that the sine curve of Figure 1 illustrates a tone having a frequency of 32 cycles per second, the space between X and Y may be divided into 360 parts, each representing a degree in the cycle. For convenience it is shown to illustrate points in the cycle at 30 degree intervals, and an ordinate from a point in the curve to the horizontal represents the amplitude at that point. Although the radius of the cycle may be arbitrarily set as one, any value may be chosen, and used in plotting curves of tones of other frequencies, that are to be combined with the first. Hence in Figure 1, numeral 13 represents a value of the amplitude of a tone of the frequency of 32 cycles per second, when it has progressed one twelfth of the cycle; and for purposes of illustration that value is equal to ordinate P B, or the sine of an angle of 30 degrees, or one twelfth the unit circle representing the complete wave cycle. So, in like manner, 14 is the amplitude when the cycle is ¼ completed and corresponds with the sine of an angle of 90 degrees, or D C in the unit circle of 360 degrees. Just as point A, revolving counterclockwise would complete a circle of 360 degrees when it returned to A, so would a 32 cycle tone complete one cycle when it proceeded from X to Y with the varying amplitude value as shown (corresponding to the sine value of the unit circle).

Figure 2:
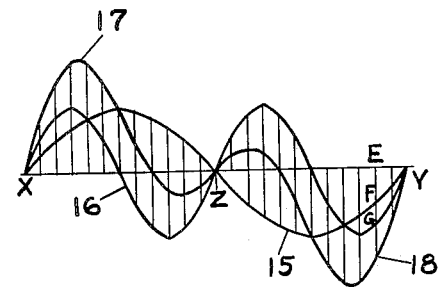
Figure 2 shows a curve formed by a composite of individual curves representing waves of different frequency.

Considering a tone of twice the frequency, or 64 cycles per second, it would complete twice as many cycles as the tone of 32 cycles per second in a given time. In other words, it would complete two cycles between X and Y. If the same unit circle were used for plotting the curve, the ordinates, or amplitude values would correspond with the sine values as heretofore described, having a maximum of one and the intermediate values, decimals of one. Thus, in Figure 2 curve 15 represents one complete cycle of a tone having a frequency for example of 32 cycles per second and curve 16 of a tone of 64 cycles per second. Curve 16 would therefore complete a cycle at Z whereas curve 15 would merely complete half a cycle to that point. The plotting of the curves is clearly shown and is usual.

By adding the amplitudes in representative form or their corresponding values, curve 17 is formed. This curve therefore, at any point represents the sum of the amplitudes of its component tones of different frequency at that point. Curve 17 at point Z will have no amplitude since the amplitude of curves 15 and 16 at that point is zero. At point 18 it will be the sum of EF, the amplitude of curve 15 at that point and of EG, the altitude of curve 16 at the same point.

Figure 3:
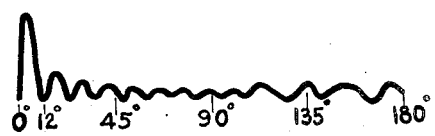
Figure 3 shows a half cycle of a curve representing the composite of the curves of a tone and a plurality of harmonics thereof.

Figure 3 shows a half cycle of a curve made in the same manner as curve 17 from the representative curves of a tone of the frequency of 16 cycles per second and 29 overtones thereof, said overtones varying in frequency 16 cycles apart, the last overtone therefore having a frequency of 480 cycles per second. Each point on said curve is a representation of the sum of the amplitude components of 30 tones of varying frequency. A component curve of 100 tones could be made if desired.

Figure 4:
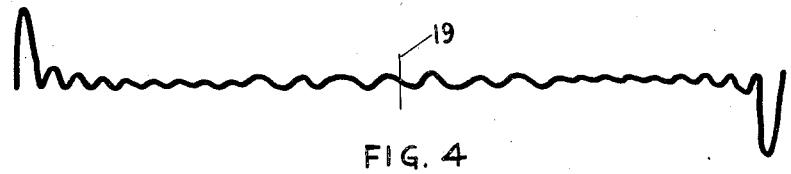
Figure 4 shows a complete cycle of the composite of the same tone and its harmonics in curve form.

Figure 4 shows the completed cycle of the curve of Figure 3. It may be seen that center line 19 divides the cycle representation into two equal parts, the half cycle to the right being identical to that on the left of the line but in opposed and reverse position. By taking a curve of a half cycle, and rotating it 180 degrees, the two adjacent ends may be joined to form a complete cycle, as shown.

Figure 5:
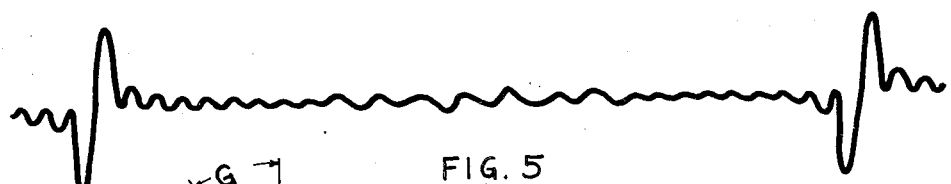
Figure 5 shows the combination of a series of cycles of a composite of sounds or their combinations, in curve form.

In Figure 5, the method of representing a series of cycles is shown. The principle employed is to join the cycles in a continuous curve by attaching the 360 degree end of one cycle with the zero end of another.

The curve representing a composite of the amplitudes of its component curves of tones of different frequency, which are generally harmonics of a fundamental tone, may be adapted to be used as a basis for determining the contour of a phonograph record, thereby enabling the production of the tone and overtones represented by the curve. The playing of the record will set up the said tone and its harmonics at one time. In the example shown in Figure 5, this record will set up 30 tones simultaneously. The ear is responding to all the thirty tones but man's mind is limited to hearing clearly one tone and its overtones at any particular instant of time. So when you sing, your own fundamental tone and its harmonics pick out the corresponding tone and the harmonics of that tone amongst the 30 tones present in the air and the attention is on them only. The harmonics in a voice are weak but are apparently magnified by being in resonance with certain of the corresponding tones set up. The voice of the singer then seems to play on the vibrating air, every tone of the 30 acting as a string, the voice playing and choosing the corresponding tones of the same pitch in the air as the fingers do the strings of a harp. A record may produce all or a large number of the tones of music so that one or more persons either singing or talking, may use the tones as an accompaniment.

Such a curve may be adapted for use on a record in combination with the recorded speech or music of an artist, thus affording an artist his own accompaniment by automatically synchronizing with those tones which correspond in pitch to his own tones and harmonics.

For purposes of expeditiously forming a curve representing any combination of tones, tables may be compiled of the ordinate value of tones of various frequencies, when their corresponding values in the unit circle at intervals one degree apart are tabulated. Thus the values of the sine at each degree along a sine curve representing a tone of 64 cycles per second, 96 cycles per second, and other frequencies may be arranged in table form. It is necessary to compile the values up to 180 degrees or the half cycle point in order to be able to form the complete cycle curve as heretofore explained. Adding the values of the ordinates at any point will give the value of the combination of tones graphed.

Such a composite curve, if composed of components of curves of many harmonics of a tone, will give a sound composed of the tone and the overtones, the individual tones having equal intensity. This intensity must be modulated to harmonize with the perceptive power of the human ear. For example, the sine values of certain tones may be multiplied or divided by a constant, so that the composite tone may have desired characteristics agreeable to the human ear.

In applying a composite curve to form the contour of a phonograph record or the like for the production of the tones represented thereby, a half cycle of a curve representing for example a 16 cycle tone and 99 harmonics, up to 1,600 cycles per second, is drawn on paper using as a zero line a circle 155.17 inches in diameter. By copying and rotation 180 degrees of the half cycle curve, the second half cycle is drawn. The complete cycle may be used as a master or tracing from which the prints are made. The prints of the first cycle are formed end to end on a circle having a diameter of 155.17 inches, or to form a spiral of continuously decreasing diameter. The composite curve 155.17 inches in diameter is photographed directly from the sheet on a 14 inch copper plate having a record space averaging 9 inches in diameter for an ordinary 12 inch record. After etching, the copper plate is backed up and becomes a master from which copies may be made.

The diameter 155.17 is derived as follows: A phonograph record having an average 9 inch diameter has a circumference of 28.2744 inches. The average rotation of a phonograph disc when turning is 1¼ revolutions per second. Then 28.2744 inches × 1¼ equals 35.343 inches per second travelled by a point on the circumference of the record. Thus, the length of one cycle of a 16 cycle tone equals $\frac{1}{16}$ × 35.343 inches or 2.2089 inches per cycle.

For convenience in composing a composite curve, the fundamental 16 cycle tone is graphed on a line 37.5 inches long. For 13 cycles of a 16 cycle tone, the diameter of the working circle is $$\frac{37.5 \times 13}{3.1416} = 155.17 \text{ inches}$$

Since the enlarged diameter of the one hundred tone curve is 155.17 inches and the average diameter of a record is 9 inches, the photographic reduction must be 17 times approximately. Variations in the proportionate reduction may be made in order to afford better traction for the needle.

The width of the drawn line of the 100 tone curve on the 155.17" diameter is such that when reduced 17 times approximately it is just wide enough to take the point of a phonograph or graphophone needle, i. e., 17 times approximately the width of the grooves on a tablet.

Figure 6:
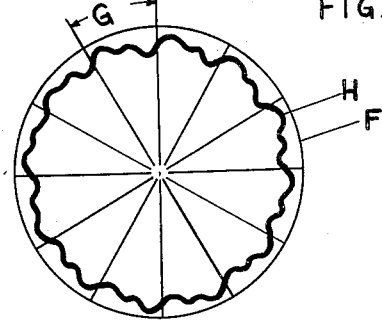
Figure 6 represents the application of a graph or curve to the surface of a phonograph record.

Figure 6 illustrates the contour of a composite curve representing curves of two tones, impressed on the surface of a record. The space marked by G shows a representation of one cycle of the composite curve on the face of the record. The complete curve H on the record F shows 12 complete cycles joined in successive relation.

By extended experiment, it has been discovered that certain sounds are produced from a phonographic record when certain forms are given to indentations in the face of the record. A certain designing of a groove would cause the needle and reproducing unit to produce a sound as the letter A of the alphabet. Another form or shape in the record would be found to give a sound as O in the alphabet, etc. (In my article "The true nature of speech," see, Transactions of the American Institute of Electrical Engineers, Feb. 9, 1916, a "phonographic alphabet is set forth" showing letter form corresponding to all letters of the alphabet).

By combining a composite curve representing a tone and its harmonics with curves as aforesaid, representing letters of the alphabet, a resultant curve may be obtained which may be applied to a record. Production, therefore, of sounds or predetermined words or letter combinations of certain frequency may thus be brought about.

Figure 7:
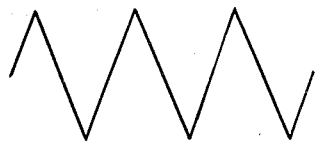
Figure 7 shows a representation of an ordinary sound wave of audible frequency.

Figure 7 shows a curve representing a tone of the frequency of 480 cycles per second.

Figure 8:
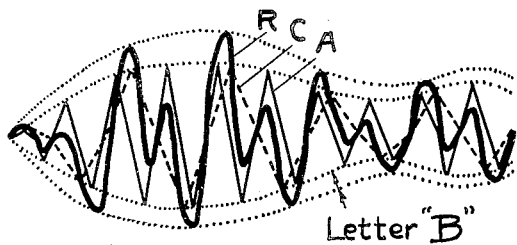
Figure 8 shows the adaptation of the wave in Figure 7 to a wave pattern of a letter of the alphabet.

In Figure 8 curve C represents a tone of the frequency of 480 cycles per second and curve A is the representation of one of 960 cycles per second, both curves modified in amplitude according to the letter B phonographic alphabet pattern. Curve R is an enlarged graphic illustration of the curve or contour in the face of a record which would produce the sound "B" when subjected to a needle and the usual reproducing means. R is the resultant curve obtained by combining the composite curve of the 480 and 960 cycle curves with the curve of the letter B to impart to it when reproduced, the tones represented thereby. While Fig. 8 illustrates a graphical method of varying tones in accordance with the variation in the form of the curve representing the letter B, it is understood that in practice the curve R is drawn directly from the sums of the ordinate values of the sine curves of 480 and 960 cycles at successive degree points, these values modified by multiplication or division by the ordinate values of the curve of letter B at successive degree points.

Figure 9:
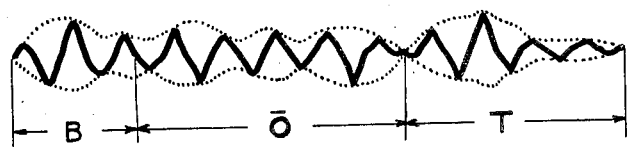
Figure 9 shows the adaptation of the wave in Figure 7 to a composite of wave patterns of the letters of a word.

The same application is practicable with a plurality of letters, and the combination of the resultant curves when reproduced would sound a word. Thus, in Figure 9, the letters "B," "O," and "T" are graphically illustrated in combination with a curve representing a tone of the frequency of 480 cycles per second, to form a resultant curve which upon reproduction would sound the word "Boat" at a frequency of 480 cycles per second.

Figure 10:
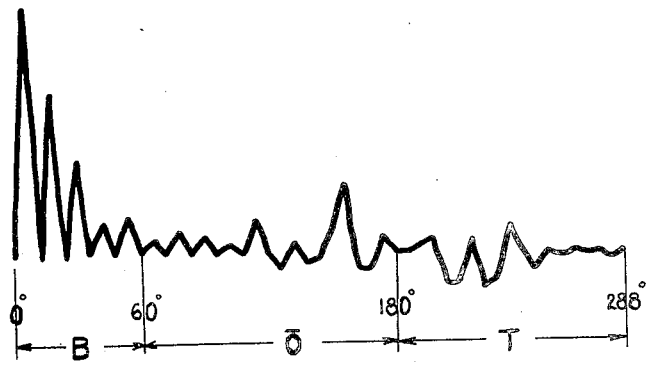
Figure 10 is a graphic representation in detail of the wave form of a thirty tone curve constructed to speak "Boat".

Figure 10 is a graphic illustration in detail of the resultant curve of the letters B, O and T sounding as "Boat" in combination with the composite of a curve representing a tone of 16 cycles per second and 29 harmonics thereof.

The same principle may be employed in the radio field, for setting up a tone of certain frequency and a plurality of harmonics thereof, to act as an accompaniment for a singer or speaker, both as an amplifying aid and in obtaining synchrony in tone.

Thus, a synthetic tone may be produced by electron tubes combined with electrical circuits capable of oscillating electrically to separately produce distinct tones.

Figure 11:
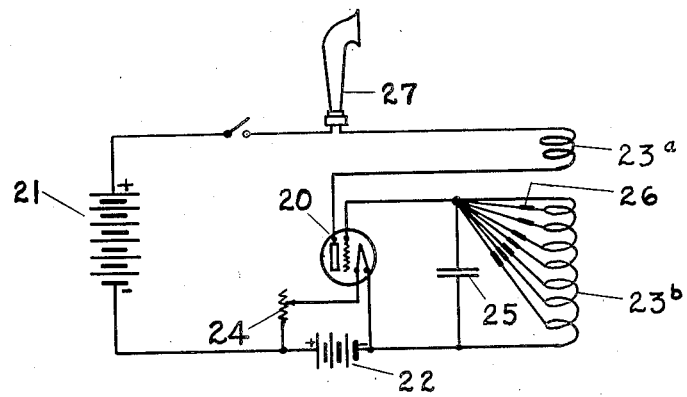
Figures 11 and 12 show the application of the principle to an arrangement of radio apparatus.

Figure 11 illustrates a means whereby one electron tube connected to as many as 100 oscillation circuits each designed for a different frequency or tone may be used to produce 100 tone music.

Figure 12:
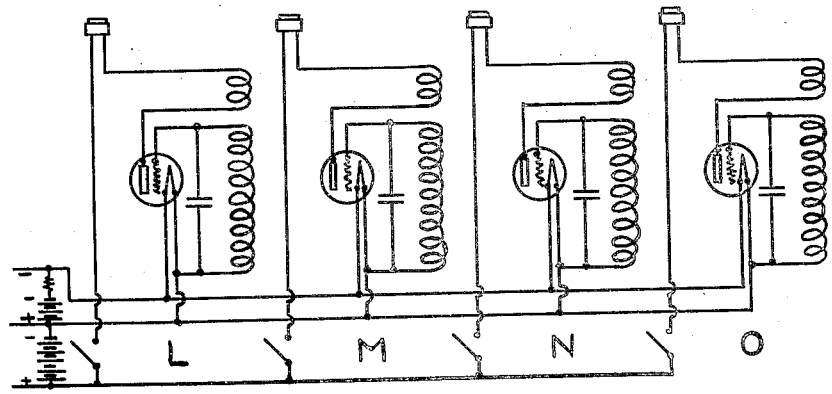

Figure 12 illustrates how the same result is accomplished by using as many as 100 electron tubes each with a separate oscillation circuit.

The 100 tone music is broadcast from a transmitting station and received by the listener at the usual radio receiving set just as any music is received by it. Then the air within hearing range of the loud speaker is vibrated simultaneously with 100 tones of sound in harmonious relation with each other, which accompany the song of the hearer of the 100 tone music or the music of an instrument through resonance of tones in the vibrating air corresponding to the pitch of the tones and harmonics thereof in the voices or instrument.

In detail, Figure 11 illustrates an electrical device for producing music with as many as 100 different tones sounding simultaneously, having the usual electron tube 20 with grid, plate and filament as shown, a source of 90 volt direct current such as a "B" battery 21, a source of 6 volt direct current such as an "A" battery 22, transformer coils 23$^a$ acting as the low voltage side and connected to the plate and loud speaker 27, and coils 23$^b$ the high voltage side of the transformer connected to the grid and filament. Resistance 24 is used to regulate the current in the filament. Condenser 25 is used in combination with the inductance of certain turns of the transformer 23$^b$ and the circuit separators 26 to form oscillation circuits each differently tuned and connected to the single oscillation electron tube 20. The loud speaker 27 changes the electrical oscillations into sound vibrations for broadcasting purposes. If desired, the wires leading to the loud speaker 27 may be directly connected to the broadcasting circuit.

Figure 12 shows 4 circuits L, M, N and O each tuned to transmit a tone or its harmonics of certain frequency. Thus, circuit L may be tuned to a tone of 264 cycles per second, circuit M, a tone of 528 cycles per second, etc. By providing a plurality of such circuits, a plurality of such audible harmonics of a pure tone may be transmitted as may be desired for various purposes. The circuits are self evident and need not be explained.

Methods and apparatus embodying electrical and mechanical equivalents may be used without departing from the spirit of the invention.

Having thus described my invention, what I claim as new and desire to secure by Letters Patent is:—

1. A method of producing sound consisting in the mathematical combination of the amplitudes of the component harmonics of a composite sound, making a curve representing said combinations, illustrating said curve on an enlarged drawing, reducing said curve to a master plate, and using said plate for producing said sound and for serving as a master for copies thereof.

2. A method of producing words consisting in the mathematical combination of the amplitudes of the component harmonics of a composite sound, mathematically varying the values of the said combination in accordance with the mathematical values of the ordinates of the curves representing letters of words, making a composite curve representing the resultant values, illustrating said curve on an enlarged drawing, reducing said curve to a master plate, adapting said master plate for producing said words and for making copies therefrom.

3. A method of producing a tone and a plurality of harmonics thereof by representing each of said harmonics by its sine values at angular increments, mathematically combining the sine values of said harmonics at said points, plotting the resultant values as points along a curve, joining said points to form a curve, forming a curve having a series of cycles, arranging said curve on an enlarged drawing, reducing said curve to a master plate, and adapting said master plate for producing said tones.

4. A method of producing words consisting in mathematically representing a plurality of harmonics by their sine values, mathematically representing a plurality of symbols representing the letters of the alphabet by the ordinate values of the wave shapes of said letters, the mathematical combination of the sine values of the said harmonics, the mathematical variation of the values of the harmonic combination in accordance with the values of the ordinates of the curves representing letters of words, making a composite curve representing the resultant values, illustrating said curve on an enlarged drawing, reducing said curve to a master record, and adapting said record to produce said sounds when played with a sound reproducing machine.

JOHN B. FLOWERS.